United States Patent Office 3,417,045
Patented Dec. 17, 1968

3,417,045
POLYMER COMPOSITION
Walter A. Henson and Robert L. Zimmerman, Midland, Mich., assignors to The Dow Chemical Company, Midland, Mich., a corporation of Delaware
No Drawing. Continuation-in-part of application Ser. No. 97,730, Mar. 23, 1961. This application Aug. 19, 1966, Ser. No. 573,486
16 Claims. (Cl. 260—33.6)

ABSTRACT OF THE DISCLOSURE

This application relates to epoxy compositions containing homogenous copolymers of vinyl aromatic compounds and an $\alpha,\beta$-unsaturated dicarboxylic acid or anhydride which are useful in coatings and laminates.

---

The present invention relates to polymer compositions and is more particularly concerned with heat-converted protective and decorative coatings of thermosetting compositions of homogenous copolymers of vinyl aromatic compounds with $\alpha,\beta$-unsaturated dicarboxylic acids or anhydrides and epoxy compounds, for machines, household appliances, automotive equipment, tools, metal panels, moldings, laminates, and the like. This application is a continuation-in-part of our copending application Ser. No. 462,711 filed June 9, 1965 which was in turn a continuation-in-part of Ser. No. 97,730 filed Mar. 23, 1961 which is now abandoned.

We have discovered that hard, tough, glossy, transparent and adherent continuous coatings and laminates may be produced by forming an intimate mixture of (A) a homogenous copolymer of (1) from 99 to 65 parts, preferably from 97 to 80 parts by weight of a vinyl aromatic compound, and, correspondingly, (2) from 1 to 35, preferably from 3 to 20 weight percent of an $\alpha,\beta$-unsaturated dicarboxylic acid or anhydride, and (B) an epoxide having an epoxide equivalent weight of between 44 and 1000, preferably between 70 and 550, in a ratio to the vinyl aromatic copolymer such that the epoxide to anhydride, or anhydride plus COOH, ratio is between 0.2 and 2.5, advantageously from 0.5 to 2.0, preferably in an organic solvent with or without an added catalyst, applying this resin solution to a substrate and baking to cause a curing reaction. It is preferred that the thermosetting composition contain at least 60 parts by weight of the vinyl aromatic copolymer.

It is desirable that the copolymer have a molecular weight characterized by 10 percent solution viscosity in methyl ethyl ketone at 25° C. of 0.5 to 20 cps., preferably 0.9 to 10 cps.

"Homogenous" refers to copolymer composition homogeneity. Such copolymers are essentially gel-free and transparent, that is, optical transmission is above 80 percent.

By fractional precipitation methods the homogeneous copolymers are shown to have an essentially uniform copolymer distribution, that is, at least 90 percent of the copolymer will have an unsaturated anhydride component composition which does not vary more than 5 percent, with best samples not varying more than 2 percent.

Vinyl aromatic compounds which are suitable include, for example, styrene, vinyltoluene, t-butyl styrene, chlorostyrene, dichlorostyrene, $\alpha$-methyl styrene, vinyl xylene and the like.

$\alpha,\beta$-Unsaturated dicarboxylic acids or anhydrides which are suitable include, for example, maleic anhydride, chloromaleic anhydride, citraconic anhydride, itaconic anhydride, aconitic anhydride, fumaric acid, itaconic acid and the like.

Copolymers useful in the present invention are preferably prepared from the vinyl aromatic monomer and acid anhydride by solution polymerization, although bulk polymerization methods may also be employed. Two requirements of the polymerization method are (1) that it results in relatively uniform copolymer composition, and (2) that the copolymer be essentially uncrosslinked.

The preferable route, however, is to prepare the anhydride containing copolymer as described in U.S. Patent 3,336,267 issued Aug. 15, 1967. This reaction is advantageously carried out in an aromatic or ketonic solvent or solvent blend.

While the invention is applicable to epoxides, i.e., three member heterocycles containing one oxygen and two carbon atoms, generally, preferred polyepoxides are glycidyl polyethers of aromatic polyhydric compounds having epoxide equivalent weights of 110 to 550. Glycidyl ethers of polyhydric alcohols are also well known. These polyepoxides are made by reacting at least about two mols of an epihalohydrin with one mol of a polyhydric alcohol such as ethylene glycol, pentaerythritol, etc., followed by dehydrohalogenation according to U.S. Patent 2,581,565.

In addition to polyepoxides made from alcohols or phenols and an epihalohydrin, polyepoxides made by the known peracid method are also suitable. Epoxides of unsaturated esters, polyesters, diolefins, and the like can be prepared by reacting the unsaturated compound with a peracid. The reaction is one of epoxidation of compounds with isolated double bonds, at a temperature sufficiently low so that the acid resulting from the peracid, for example, acetic acid in the case of peracetic acid, does not react with the resulting epoxide group to form hydroxyl groups and ester linkages. Preparation of polyepoxides by the peracid method is described in various periodicals and patents and such compounds as butadiene, cyclic olefins, ethyl linoleate, as well as di- or tri-unsaturated drying oils or drying oil acids, esters and polyesters can all be converted to polyepoxides.

Epoxidized drying oils are also well known, these polyepoxides usually being prepared by reaction of a peracid such as peracetic acid or performic acid with the unsaturated drying oil according to U.S. Patent 2,569,502.

Desirable esters for epoxidation are prepared by reacting unsaturated aldehydes with butadiene to form unsaturated cyclic aldehydes. These can be condensed by the Tischenko reaction to form esters or reduced to form alcohols which can be subsequently reacted with acids from esters.

In addition to epoxidized drying oils, butadiene dioxide and monomeric esters, polymeric esters can also be epoxidized by the peracid method as described in Australian Patent 11,862, 1955. Examples of these unsaturated polyesters are those made from unsaturated polyhydric alcohols and unsaturated polybasic acids, for example, maleic acid, 2-butenedioic acid, 4-cyclohexene-1,2-dicarboxylic acid, dimerized linoleic acid, etc., and such alcohols as ethylene glycol, 1,6-hexanediol, 3-ethylhexanediol-1,3-pentaerythritol, etc. Other polyesters which can be epoxidized with peracetic or other peracids are made from saturated acids and unsaturated alcohols, for example, 2-butenediol-1,4; 1,5-hexanediene-3,4-diol; pentene-1,5-diol, cyclohexanediol-2,5; etc., reacted with such saturated acids or acid anhydrides as malonic, succinic, glutaric, terephthalic, etc.

Examples of such polyepoxides include the diglycidyl ether of diethylene glycol or dipropylene glycol, the diglycidyl ether of polypropylene glycols having molecular weights up to, for example, about 2000, the triglycidyl ether of glycerine, bisphenolic epoxies, epoxy novolacs, glycidyl ethers of Cashew nut oil, epoxidized soybean oil, epoxidized unsaturated polyesters, vinyl cyclohexene dioxide, dicyclopentadiene, dioxide, dipentene dioxide, epoxidized polybutadiene and epoxidized aldehyde condensates such as 3,4-epoxy-6-methylcyclohexylmethyl-3,4-epoxy-6-methylcyclohexane carboxylate.

Monoepoxides which are suitable include 3,4-epoxy-6-methylcyclohexylmethyl acetate; 2,3 - epoxy - 2 - ethylhexanol; allyl-9-10-epoxystearate; 1,2-diisobutylene oxide; triisobutylene oxide; styrene oxide; epichlorohydrin; butyl glycidyl ether, butylene oxide, propylene oxide, ethylene oxide, glycidol and the like. When employing the lower boiling epoxies it is preferable to use pressure when curing, although, if desired, curing may be carried out at room temperature for somewhat longer periods of time.

Curing catalysts such as tertiary amines or amine salts, quaternary amine bases or salts, or inorganic bases may be used, if desired, to shorten the curing time.

The compositions of the present invention may include other additives such as plasticizers, fillers, pigments and the like. If desired, reactive agents such as epoxy, hydroxy, carboxy, anhydride, and mercapto-containing agents may be employed to obtain desired effects. Examples of such agents include polyesters made from phthalic or adipic acid and ethylene glycol or glycerine; anhydrides such as dodecyl succinic anhydride and trimellitic anhydride; and liquid mercaptan terminated polysulfide polymers. Non-reactive plasticizers and additives such as n-butyl stearate, dioctyl diphenyl oxides, tris butyl phenyl phosphate; glass, cellulosic or synthetic fibers; metal fillings, pigments, and inorganic fillers may be added as desired.

Coating and laminating applications normally employ organic solvent solutions of the copolymer-epoxy compositions. The solvent or solvent blend employed is chosen to provide the desired volatility, viscosity, rheology, sprayability and/or other properties.

Solvents which are suitable include aromatic hydrocarbons such as toluene and xylene, ketones such as methyl ethyl ketone, methyl isobutyl ketone, diacetone alcohol, and mesitylene oxide, high solvency naphthas, mineral spirits and alcohols, although mineral spirits must normally be used with another solvent and the alcohols are not generally preferred because of their reactivity with the anhydride in the polymer.

Inasmuch as aromatic hydrocarbons provide economic solvents for the resins of this invention, a particular advantage is gained by using less than 20 mole percent of maleic anhydride in the vinyl copolymer. With greater amounts than this, solvent blends are usually required to dissolve the resin and higher viscosity solutions generally result. In addition, at higher maleic content the amount of epoxy resin required to react with the carboxyl groups becomes greater and can lead to over crosslinking as well as economic disadvantages.

Compositions of this invention may, if desired, be prepared in an aqueous medium by converting the vinyl aromatic α,β-unsaturated dicarboxylic acid copolymers, preferably those containing between 10 and 35, more desirably those containing between 15 and 30 weight percent of the acid, to a water-soluble salt and dispersing the epoxy compound therein.

The polyepoxy used to cure or thermoset the vinyl copolymer resin also imparts improved adhesion to a substrate such as glass, metal, wood, etc. This allows even very hard thermoset composition to exhibit good impact resistance and flexibility in that although crazing may occur, a coating, for example, will still adhere. Flexibility may be attained by incorporating plasticizing additives or by choosing a flexible type polyepoxy or a mixture thereof with a harder type polyepoxy.

The present invention may be further understood by reference to the following examples which are not to be construed as limiting.

EXAMPLE 1

A solution of 26 parts of a clear, transparent styrene maleic anhydride copolymer containing 20 weight percent maleic anhydride, 9 parts of the diglycidyl ether of Bisphenol A having an average molecular weight of 340 and 65 parts of methyl ethyl ketone was prepared. This solution had an absolute viscosity of about 200 c.p.s. Glass panels were coated with the solution and baked in an oven at 200° C. After 15 minutes, the films were insoluble in methyl ethyl ketone, and stable when immersed in water for 2 days. When coated on a tin-plated steel panel and baked at 150° C. for 4 hours, the film was glossy, stable in water for more than 4 months, crazed but did not fail when bent around a ¼ inch mandrel and showed no failure on concave impact test at 10 inch pounds.

EXAMPLE 2

N-methyl morpholine, 1.5 weight percent based on copolymer-epoxy resin, was added to a portion of the solution prepared in Example 1. The resulting solution was spread on glass panels and baked at 200° C. for 5 minutes. The film was insoluble in methyl ethyl ketone.

EXAMPLE 3

The experiment of Example 2 was repeated using triethylamine in place of the N-methyl morpholine. After curing for 10 minutes, the films were insoluble in methyl ethyl ketone.

EXAMPLE 4

A series of copolymers having the composition as indicated in the following table were prepared by the continous coil copolymerization method of copending application S.N. 33,376, filed June 2, 1960. In that method, a ketone solvent in an amount of 5 to 50 weight percent based on total non-polymeric constituents in the reactor, is employed to produce a homogeneous solution from which clear and homogeneous copolymers are obtained. These copolymers were then dissolved in methyl ethyl ketone with an amount of a polyepoxide necessary to provide the indicated epoxide to anhydride ratio and with 0.3 weight percent of Arquad 12 (a 50 percent alcohol solution of dodecyl trimethyl ammonium chlorides) as catalyst. The solutions were evaporated overnight and then cured at 160° C. for one hour. The films had good clarity and cure, as measured by insolubility in methyl ethyl ketone. They were of fair to good hardness.

The polyepoxides employed in these compositions were DER332 diglycidyl ether of Bisphenol A; Epon 812 (a product having an epoxide equivalent weight of 140–165, an average molecular weight of 300 and a viscosity at 25° C. of 150–210 c.p.s.); the diglycidyl ether of a polypropylene glycol having an average molecular weight of about 400 and an epoxide equivalent weight of about 355 (herein designated as Epoxy 355); 3,4-epoxy-6-methylcyclohexylmethyl-3, 4-epoxy-6-methylcyclohexane carboxylate (Unox 201); Oxiron 2001 (a product having an epoxide equivalent weight of 145 and an iodine number of 154); Epoxol 7-4 (an epoxidized soybean oil having an epoxide equivalent weight of 240 with an average of 4 epoxide groups per molecule); Cardolite NC 513 (an epoxidized cashew nut oil having an epoxide equivalent weight of 475–575); DEN–438 epoxy novolac having a molecular weight of 600 and an epoxide equivalent weight of 176; and X2633.8 an epoxidized Bisphenol A having an epoxide equivalent weight of 298.

All of the indicated copolymers were individually cured with Epoxy 355, Epon 812, Unox 201, 3,4-epoxy-6-methylcyclohexylmethyl acetate, 2,3-epoxy-2-ethylhexanol and allyl-9,10-epoxystearate. The remaining polyepoxides were individually employed as curing agents as indicated in the table.

TABLE I

| Run | Wt. percent maleic anhydride | Polymer, wt. percent styrene | Viscosity 10% MEK 25° C. | Ratio of epoxide to anhydride | Polyepoxide curing agent |
|---|---|---|---|---|---|
| 1 | 5.83 | 94.17 | 7.5 | 0.85 | X2633.8/Epoxol 7-4/Oxiron 2001/Cardolite NC513. |
| 2 | 8.26 | 91.74 | 6.9 | 0.85 | X2633.8/Cardolite NC513. |
| 3 | 14.8 | 85.2 | 4.7 | 0.85 | X2633.8/Epoxol 7-4/Oxiron 2001/Cardolite NC513. |
| 4 | 19.9 | 80.1 | 4.2 | 0.85 | X2633.8/Epoxol 7-4/Oxiron 2001/Cardolite NC513. |
| 5 | 32.4 | 67.6 | 3.4 | 0.85 | X2633.8/Epoxol 7-4/Oxiron 2001/Cardolite NC513. |

EXAMPLE 5

A copolymer of 13.5 weight percent maleic anhydride and 86.5 weight percent of vinyltoluene was prepared as in Example 4. Ten gram portions of this copolymer were dissolved in xylene with varying amounts of DER332 epoxy resin to provide epoxide to anhydride ratios of 2.0, 1.67, 1.43, 1.25, 1.11, and 1.0; and 0.3 weight percent of Arquad 12. Films were cast from the solution on 10 mil tin plate test panels and cured at 150° C. for one hour. The films were of good clarity and had good xylene resistance. They were resistant to marring, exhibited good adhesion and on a reverse impact test of 30 inch pounds, the films adhered tenaciously.

EXAMPLE 6

A series of acid and hydroxy polyesters was prepared by reacting 5 moles of adipic acid with 4 moles of glycerine, 3 moles of adipic acid with 4 moles of glycerine, 2 and 3 moles of adipic acid with 3 and 2 moles of ethylene glycol, respectively, and 5 moles of ethylene glycol with 4 moles of phthalic anhydride. These polyesters plus dodecyl succinic anhydride. Thiokol LP-3 (liquid polysulfide), polyglycol E-600, and trimetallic anhydride were employed individually as additives in DER-332 epoxy resin modified styrene-maleic anhydride copolymers in quantities of from 4.6 to 45.8 weight percent, based on total weight of copolymer+DER332 epoxy resin additive. Films were cast from a toluene-methyl ethyl ketone solvent (1/1) and cured for 75 minutes at 160° C. The films were of good clarity, fair to good impact resistance and had good resistance to marring.

EXAMPLE 7

In a manner similar to that of Example 6, a series of compositions containing non-reactive additives such as [2-2'(2-ethylhexanamido) - diethyl-di-2-ethylhexoate], n-butyl stearate, dioctyl diphenyl oxide, tris butyl phenyl phosphate, and low molecular weight poly-α-methyl styrene were prepared. These films were of good color, clarity, and mar resistance and did not peel when immersed in acetone.

EXAMPLE 8

A copolymer of 324 grams of dichlorostyrene and 36 grams of maleic anhydride was prepared by refluxing in methyl ethyl ketone for 15 hours in a nitrogen atmosphere using azo-bis-isobutyronitrile as a catalyst. The viscosity (10% in MEK) was 0.66 cps. A composition containing 10 grams copolymer, 2.15 grams DER332 epoxy resin, 0.091 ml. of Arquad 12 and 0.664 gram of dodecyl succinic anhydride was cast from MEK and baked at 160° C. for 70 minutes. The films had good color and clarity and were resistant to marring. They did not swell or peel in acetone.

EXAMPLE 9

25 grams of the copolymer of Run 3 of Example 4 were dissolved in dry acetone and 2.5 grams of styrene oxide were added. The solution was evaporated overnight in an open dish and then baked at 100° C. for one hour. The resulting product was insoluble in MEK and was transparent and hard.

EXAMPLE 10

A copolymer of 90 weight percent dichlorostyrene and 10 weight percent maleic anhydride, prepared as in Example 4, was dissolved in acetone to 40 percent solids. There were then added 35.5 parts of DER332 epoxy resin per 100 parts of copolymer and 0.5 weight percent, based on total solids, DMP-30 solids. The resulting mixture was thinned to 40 percent solids with MEK.

Glass cloth (weave style 181 with Volan A finish) was saturated with this solution by repeated dipping and allowed to air dry for 1½ hours followed by oven drying at 130° F. for 5 minutes. The final weight ratio of glass to resin was 52.5/47.5.

Twelve plys of the treated cloth were stacked in a flat press at 300° F. After 15 seconds at 50 p.s.i., the pressure was raised to 400 p.s.i. for 3 minutes, then 700 p.s.i. for 27 minutes. The laminate was cooled 5 minutes. It was transparent, hard, strong, had good appearance and was self-extinguishing in 5 seconds after removal from a flame source.

EXAMPLE 11

A copolymer of 95 weight percent styrene and 5 weight percent fumaric acid was prepared as in Example 4 employing dimethyl formamide as a solvent. The polymer was clear. Viscosity (10% in MEK) was 2.23 cps. Ten grams of the polymer were formulated with 0.746 grams of DER332 epoxy resin and 0.3% DMP-30 and baked on tin plate at 150° C. for 1 hour. The resulting clear coating (1.1 mils) had excellent xylene and mar resistance.

EXAMPLE 12

A homogeneous copolymer of styrene and maleic anhydride containing 18.06 weight percent MA and having a solution viscosity of 0.67 cps. (10% in MEK) was prepared by the continuous coil polymerization method without recycle at 235° C. using a feed of 61.4 weight percent styrene, 10.0 weight percent MA and 28.6 percent methyl isobutyl ketone. The percent solids in the reactor was 71.4 and the product solution was devolatilized at 250° C. yielding on grinding a fine white powder containing 6.5% volatiles. Six grams of this powder were dissolved in aqueous ammonia to form about a 15% solids solution at a pH of 7 to 8 and 2.7 g. of Dowanol TBH butyl ether (Triethylene glycol mono butyl ether and higher having an OH equivalent weight of 240) and 1.9 g. of DER332 epoxy resin were added. Upon mixing, an opaque but stable dispersion was formed that was readily cast on a tin plate test panel. After air drying the coating was baked at 150° C. for 30 minutes resulting in a mar resistant, acetone insoluble, clear protective coating which was unaffected by 4 hours immersion in a steam bath.

Similar results were obtained with a polymer containing 23% MA. Similarly, 2-methylpentanediol-3,4 and polyglycol P-600 were substituted in equivalent amounts for the Dowanol TBH butyl ether with the resulting coatings exhibiting similar properties of mar resistance, acetone insolubility and water insensitivity.

EXAMPLE 13

To illustrate the near equimolarity of styrene-maleic anhydride copolymers prepared by the prior art methods, Example VII of U.S. Patent 2,530,983 to H. F. Minter was repeated as follows:

A charge of: 28.98 grams maleic anhydride, 17.22 grams maleic acid, 153.80 grams styrene, 200.00 grams acetone, and 1.34 grams t-butyl perbenzoate was mixed at room temperature for about an hour and then heated to reflux. After heating at reflux for three hours, 300 grams of acetone was added to cool the mixture and prevent further polymerization.

(A) 278 grams of the resulting syrup was poured into about 3000 grams of Skellysolve 60–70° C., and the precipitate was removed by filtration, washed with dry ether and air dried. A portion of this product was devolatilized at 190° C. for 2 hours under vacuum and a 16.9 gram sample of the devolatilized product was dissolved in 200 grams methyl isobutyl ketone and fractionally precipitated with Skellysolve 60–70° C. The results were as follows:

| Fraction | Skellysolve (ml.) | Wt. product (grams) | Maleic anhydride content of product (percent) |
|---|---|---|---|
| 1 | 50 | 8.82 | 42.4 |
| 2 | 50 | 7.37 | 40.7 |
| 3 | 700 | 0.29 | |
| 4 | Residue | 0.14 | |
| | | 16.62 | |

The maleic anhydride content was determined by titration with alcoholic KOH and was checked by infrared analysis which indicated less than 5% maleic acid present.

(B) 49.82 grams of the syrup were poured into about 1000 grams of diethyl ether, the resulting precipitate removed by filtration and oven dried for 3 days at 60° C. The product weighed 3.5 grams and titrated 4.76 meq. KOH per gram. Infrared indicated less than 5% maleic acid present. Assuming the maleic moiety is all anhydride, the weight percent anhydride in the copolymer was 46.7, i.e., the polymer contained 1.87 grams styrene and 1.63 grams maleic anhydride. The percent conversion was 24.6%. Thus, this sample contained about 8.03 grams of unreacted styrene plus about 0.42 gram maleic anhydride and 1.23 grams maleic acid or about 16% of the remaining monomer was the maleic moiety whereas in the initial starting mixture the maleic coiety constituted 30 percent of the monomer.

Various modifications may be made in the present invention without departing from the spirit or scope thereof and it is understood that we limit ourselves only as defined in the appended claims.

We claim:

1. A clear, thermosetting coating composition comprising (A) a homogeneous copolymer of (1) from 99 to 65 weight percent of vinyl aromatic compound, (2) from 1 to 35 weight percent of an $\alpha,\beta$-unsaturated dicarboxylic acid or anhydride, said copolymer having a distribution such that at least 90 percent of the copolymer will have an unsaturated anhydride component composition which does not vary more than 5 percent and (B), an epoxide having an epoxide equivalent weight of between 44 and 1000, in a ratio to the vinyl aromatic copolymer such that the epoxide to anhydride, including anhydride plus COOH, ratio is between 0.2 and 2.5.

2. Composition of claim 1 wherein the vinyl aromatic copolymer comprises at least 60 weight percent of said composition.

3. Composition of claim 2 wherein the vinyl aromatic copolymer contains from 97 to 80 weight percent of the vinyl aromatic compound, and, correspondingly, from 3 to 20 weight percent of an $\alpha,\beta$-unsaturated dicarboxylic acid or anhydride.

4. Composition of claim 1 wherein the vinyl aromatic copolymer has a molecular weight, characterized by 10 percent solution viscosity in methyl ethyl ketone by 25° C. of 0.5 to 20 cps.

5. Composition of claim 1 wherein the epoxide has an epoxide equivalent weight of between 70 and 550.

6. Composition of claim 1 wherein the epoxide is a glycidyl ether of a polyhydroxy phenol having an epoxide equivalent weight of from 110 to 550.

7. Composition of claim 1 wherein the epoxide to anhydride ratio is between 0.5 and 2.0.

8. Composition of claim 1 wherein the $\alpha,\beta$-unsaturated dicarboxylic acid anhydride is maleic anhydride.

9. Composition of claim 8, wherein the vinyl aromatic compound is styrene.

10. Composition of claim 9, wherein the epoxide is the diglycidyl ether of Bisphenol A.

11. Composition of claim 1, contained in an organic solvent therefor.

12. Composition of claim 11, wherein the solvent comprises a major proportion of xylene.

13. A method of coating an article comprising applying to a surface of the article the composition of claim 1 and thereafter curing said composition.

14. An article having on at least one surface a thin, tough continuous and adherent baked on coating consisting essentially of the composition of claim 1.

15. A laminate structure comprising at least two layers joined together by and integrally bound with, a tough, adherent, cured adhesive consisting essentially of the composition of claim 1.

16. Method of preparing coating and adhesive compositions comprising combining a homogeneous copolymer of from 99 to 65 weight percent of a vinyl aromatic compound and 1 to 35 weight percent of an $\alpha,\beta$-unsaturated dicarboxylic acid or anhydride with an epoxy compound in an amount such that the epoxide to anhydride plus COOH ratio is from 0.2 to 2.5.

References Cited

UNITED STATES PATENTS

| | | | |
|---|---|---|---|
| 2,604,464 | 7/1952 | Segall et al. | 260—80.5 |
| 2,949,438 | 8/1960 | Hicks | 260—836 |
| 3,046,246 | 7/1962 | Muskat | 260—836 |
| 3,136,136 | 6/1964 | Washburne et al. | 260—837 |

OTHER REFERENCES

A. W. Hanson and R. L. Zimmerman, Ind. & Eng. Chem., 49 (11), November 1957; pp. 1803–1806.

MORRIS LIEBMAN, *Primary Examiner.*

J. E. CALLAGHAN, *Assistant Examiner.*

U.S. Cl. X.R.

260—836, 837, 37